(12) United States Patent
Lee et al.

(10) Patent No.: US 11,736,319 B2
(45) Date of Patent: Aug. 22, 2023

(54) WIRELESS COMMUNICATION DEVICE AND PACKET PROTECTION METHOD THEREOF

(71) Applicant: Realtek Semiconductor Corp., HsinChu (TW)

(72) Inventors: Shen-Chung Lee, HsinChu (TW); Wei-Hsuan Chang, HsinChu (TW); Wen-Yung Lee, HsinChu (TW); Yu-Nan Lin, HsinChu (TW); Chih-Heng Tsai, HsinChu (TW); Tzu-Hao Tai, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 253 days.

(21) Appl. No.: 17/313,024

(22) Filed: May 6, 2021

(65) Prior Publication Data

US 2022/0166651 A1    May 26, 2022

(30) Foreign Application Priority Data

Nov. 23, 2020  (TW) .................................. 109140959

(51) Int. Cl.
*H04L 27/26* (2006.01)
*H04L 25/02* (2006.01)
*H04L 5/00* (2006.01)

(52) U.S. Cl.
CPC ........ *H04L 25/0222* (2013.01); *H04L 5/0012* (2013.01); *H04L 27/2659* (2013.01); *H04L 27/2666* (2013.01)

(58) Field of Classification Search
CPC ............... H04L 25/0222; H04L 5/0012; H04L 27/2659; H04L 27/2666; H04L 5/0053; H04L 5/0044
USPC ........................................................ 375/262
See application file for complete search history.

(56) References Cited

U.S. PATENT DOCUMENTS

| | | | |
|---|---|---|---|
| 2004/0151145 A1* | 8/2004 | Hammerschmidt | H04L 1/1607 370/349 |
| 2016/0205562 A1* | 7/2016 | Wei | H04W 16/14 455/454 |
| 2017/0308710 A1* | 10/2017 | Du | H04L 25/03866 |

FOREIGN PATENT DOCUMENTS

TW            201626749 A        7/2016

* cited by examiner

*Primary Examiner* — Tanmay K Shah
(74) *Attorney, Agent, or Firm* — Winston Hsu

(57) ABSTRACT

A wireless communication device for a transmission end of a wireless communication system is provided. The wireless communication device includes a wireless analog transmission unit, for transmitting a data packet on a data transmission channel; and a packet generating unit, for generating the data packet and at least one protection packet; wherein before transmitting the data packet on the data transmission channel, the wireless communication device transmits the at least one protection packet on at least one adjacent channel of the data transmission channel to indicate to at least one user of the at least one adjacent channel to stop using the at least one adjacent channel before transmission of the data packet is completed, and at least one frequency band of the at least one adjacent channel overlaps a frequency band of the data transmission channel.

20 Claims, 8 Drawing Sheets

US 11,736,319 B2

WIRELESS COMMUNICATION DEVICE AND PACKET PROTECTION METHOD THEREOF

BACKGROUND OF THE INVENTION

1. Field of the Invention

The present disclosure relates to a wireless communication device and packet protection method thereof, and more particularly, to a wireless communication device and packet protection method thereof capable of transmitting protection packets on adjacent channels with overlapped frequency band, to avoid collision between data packets of the adjacent channels and data transmission channel.

2. Description of the Prior Art

In the wireless communication system, before sending data packets, a protection mode is usually applied to reduce the possibility of collision with other users. For example, in the 802.11 specification, request to send (RTS), Clear to send (CTS) or Clear to self (CTS to self, CTS2Self) are all methods for protection modes. In these types of packets, a specific Network Allocation Vector (NAV) time introduced, to notify the surrounding users that a channel will be used in this following time through the declaration of the NAV time. For example, in the RTS, the NAV time is declared as 3.5 ms, which means a packet may not be sent on a channel for 3.5 ms from the start of the RTS packet. That is, the channel is regarded as occupied. The essence of the protection mode is to send a reminder packet to inform the surrounding users not to use the channel before the data packet is sent, so as to achieve the purpose of protecting the transmitted data.

However, in 2.4 GHz free frequency band used by WiFi, spacing between channels is 5 MHz, and the entire frequency band has only three channels completely separated and not affected by each other when bandwidth of each channel is 20 MHz. Under a normal use of each channel with bandwidth of 20 MHz, each channel is overlapped with the adjacent channels by 5 MHz to 15 MHz (for each channel of 40 MHz, each channel is overlapped with the adjacent channels by 5 MHz to 35 MHz). Overlapped signals may not be demodulated and may be regarded as noises, and degrade the channel utilization and are deemed collision behavior, which is unavoidable under 2.4 GHz.

Therefore, it is necessary to improve the prior art.

SUMMARY OF THE INVENTION

It is an objective of the present disclosure to provide a wireless communication device and packet protection method thereof capable of transmitting protection packets on adjacent channels with overlapped frequency band, to avoid collision between data packets of the adjacent channels and data transmission channel.

An embodiment of the present disclosure provides a wireless communication device for a transmission end of a wireless communication system. The wireless communication device includes a wireless analog transmission unit, for transmitting a data packet on a data transmission channel; and a packet generating unit, for generating the data packet and at least one protection packet; wherein before transmitting the data packet on the data transmission channel, the wireless communication device transmits the at least one protection packet on at least one adjacent channel of the data transmission channel to indicate to at least one user of the at least one adjacent channel to stop using the at least one adjacent channel before transmission of the data packet is completed, and at least one frequency band of the at least one adjacent channel overlaps a frequency band of the data transmission channel.

An embodiment of the present disclosure further provides a packet protection method for a transmission end of a wireless communication system. The packet protection method includes the following steps: generating a data packet and at least one protection packet; before transmitting the data packet on a data transmission channel, transmitting the at least one protection packet on at least one adjacent channel of the data transmission channel to indicate to at least one user of the at least one adjacent channel to stop using the at least one adjacent channel before transmission of the data packet is completed; and transmitting the data packet on the data transmission channel via a wireless analog transmission unit; wherein at least one frequency band of the at least one adjacent channel overlaps a frequency band of the data transmission channel.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
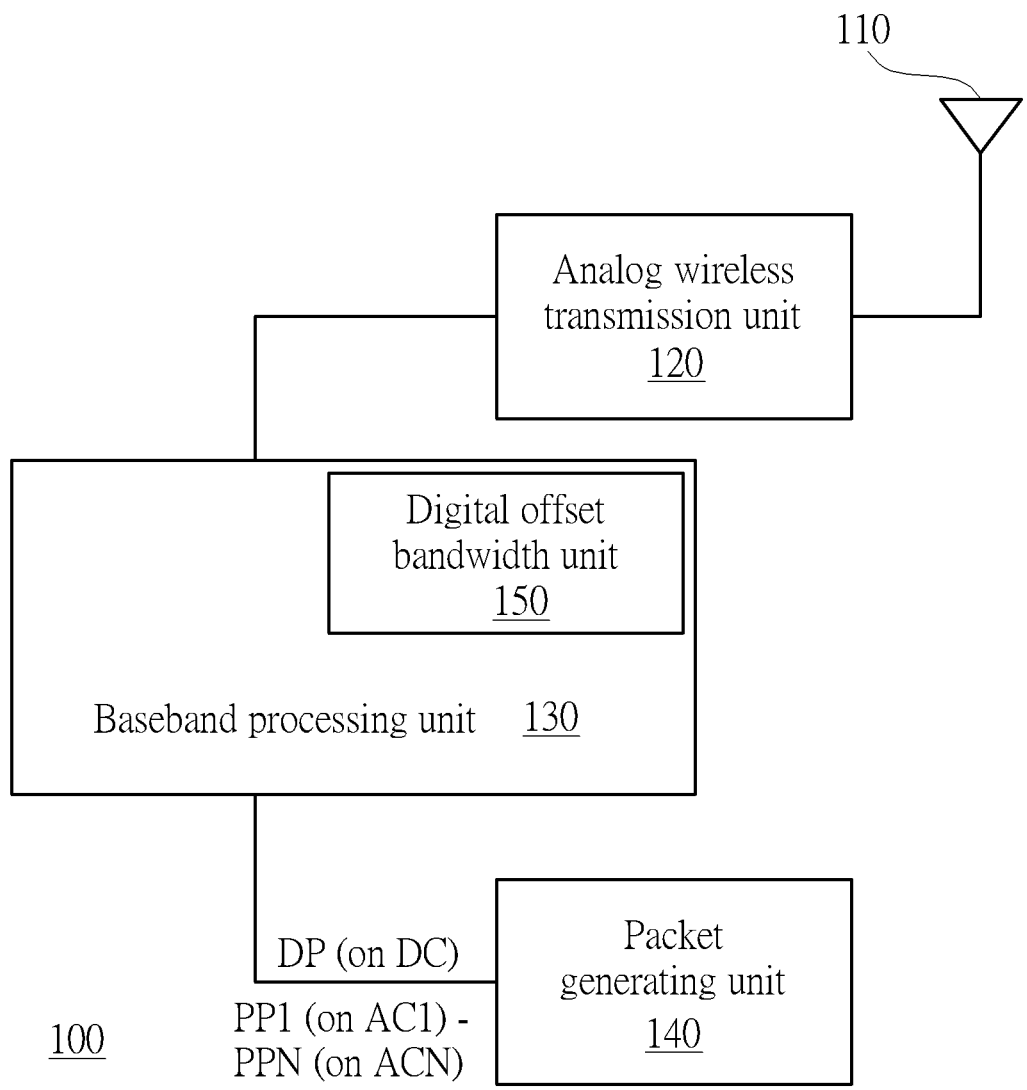
FIG. 1 is a schematic diagram of a wireless communication device according to an embodiment of the present disclosure.

For 2.4 GHz microwave frequency band, specifications such as 802.11 a/b/g/n/ax define more than ten channels on the 2.4 GHz frequency band, and each channel has a channel bandwidth of 20 MHz and is overlapped with each other. Most of the wireless communication systems, whether orthogonal frequency division Multiplexing (OFDM), or spread spectrum (SS) system, generally do not have the ability to demodulate packets on adjacent channels. Thus, packets on these overlapped channels may not be correctly demodulated, which increases the possibility of collisions. For example, if a transmission device A performs transmission on the channel Ch1, and a transmission device B is on the adjacent channel Ch2 or Ch3, the transmitting device A may initially make use of OFDM with 54 M phy rate to transmit the packets for the receiving end to receive the packet, and a statistical packet error rate (PER) of the transmitting device A may be 10% or less, which meets the specification requirements. However, once the transmitting device B on the adjacent channel Ch2 or Ch3 also starts packet transmission, since the transmitting device A cannot demodulate the packet data on the adjacent channel Ch2 or Ch3, there is a chance that the transmitting device A may mistake an idle state for the channel Ch1 and perform packet transmission. Thus, this transmitted packet may not be correctly received, thereby resulting in higher packet error rate and affecting the quality of transmitted data. In accordance with 802.11 protection mode, if the transmission device A transmits RTS/CTS or CTS2Self packet for protection before transmitting data packet, since channels used by the transmitting device A and the transmitting device B are displaced by 5 MHz, 10 MHz or 15 MHz, the transmission device B may not recognize the RTS/CTS or CTS2Self packet and still perform packet transmission. In this case, collisions will still occur. In other words, such RTS/CTS packet may not fully protect the data packets.

Thus, for a transmission end of a wireless communication system, the present disclosure provides a wireless communication device. Before transmitting a data packet on a data transmission channel, the wireless communication device transmits at least one protection packet on at least one adjacent channel of the data transmission channel to indicate to at least one user of the at least one adjacent channel to stop using the at least one adjacent channel before transmission of the data packet is completed. At least one frequency band of the at least one adjacent channel overlaps a frequency band of the data transmission channel. As a result, for the microwave band with highly overlapped channels, the present disclosure may send the protection packets on the adjacent channels that can be demodulated by users of the adjacent channels, such that the users of the adjacent channels do not transmit packets to collide with the data packet on the data transmission channel, so as to achieve better transmission performance.

Specifically, please refer to FIG. 1, which is a schematic diagram of a wireless communication device 100 according to an embodiment of the present disclosure. As shown in FIG. 1, the wireless communication device 100 is utilized for a transmission end of a wireless communication system, and includes an analog wireless transmission unit 120 connected to an antenna 110, a baseband processing unit 130 connected to the wireless analog transmission unit 120, and a packet generating unit 140. The packet generating unit 140 may be a micro-control unit (MCU), a central processing unit (CPU), or a medium access control (MAC) layer packet generator. In short, the wireless analog transmission unit 120 transmits a data packet DP on a data transmission channel DC, and the packet generating unit 140 generates the data packet DP and the protection packets PP1-PPN. The baseband processing unit 130 performs digital modulation processing on the data packet DP and the protection packets PP1-PPN. Then, the wireless analog transmission unit 120 converts the data packet DP and the protection packets PP1-PPN to corresponding channels for transmission. Finally, the data packet DP and the protection packets PP1-PPN are transmitted into the air through the antenna 110. In this case, before the data packet DP is transmitted on the data transmission channel DC, the wireless communication device 100 transmits the protection packets PP1-PPN on adjacent channels AC1-ACN of the data transmission channel DC to indicate to at least one user of the adjacent channels AC1-ACN to stop using the adjacent channels AC1-ACN before transmission of the data packet DP is completed. Frequency bands of the adjacent channels AC1-ACN overlap with a frequency band of the data transmission channel DC. As a result, for the microwave band with highly overlapped channels, the present disclosure may send the protection packets on the adjacent channels that can be demodulated by users of the adjacent channels, such that the users of the adjacent channels do not transmit packets to collide with the data packet on the data transmission channel to achieve better transmission performance.

Figure 2:
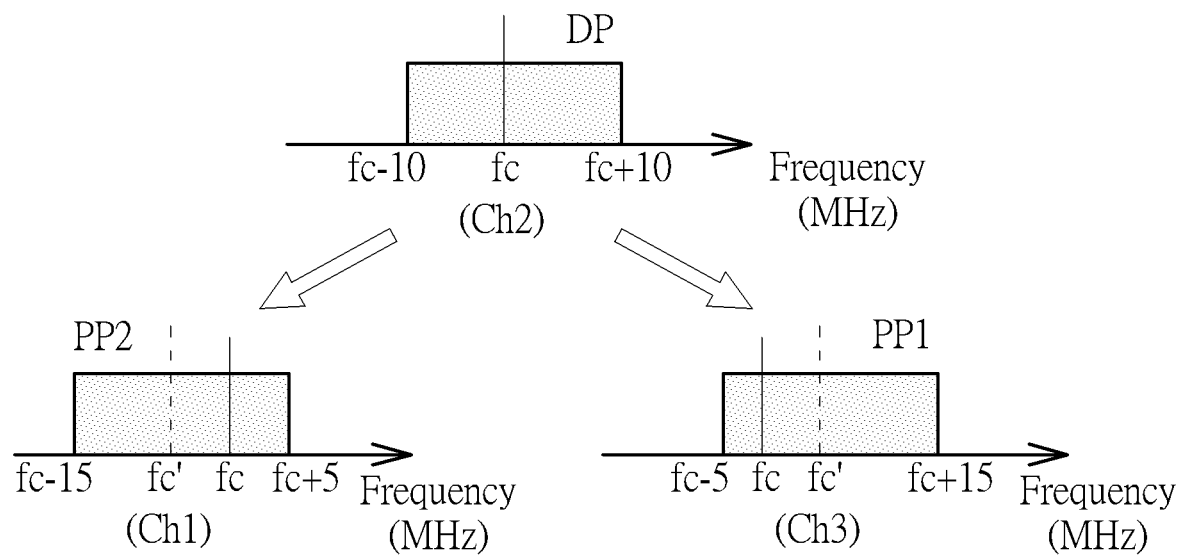
FIG. 2 is a schematic diagram of frequency bands of a data packet and protection packets according to an embodiment of the present disclosure.

In detail, the baseband processing unit 130 may include a digital offset bandwidth unit 150. When the protection packets PP1-PPN are about to be transmitted on the adjacent channels AC1-ACN of the data transmission channel DC, the digital offset bandwidth unit 150 starts and converts the protection packets PP1-PPN into frequency offset packets, to perform digital modulation processing to offset the protection packets PP1-PPN in relative to the data packet DP in a base band. Specifically, please refer to FIG. 2, which is a schematic diagram of frequency bands of the data packet DP and the protection packets PP1-PP2 according to an embodiment of the present disclosure. As shown in FIG. 2, after the packet generation unit 140 generates the data packet DP, the baseband processing unit 130 performs digital modulation, encoding process and the like on the data packet DP. At this moment, the digital offset bandwidth unit 150 is not activated. The wireless analog transmission unit 120 carries the processed data packet DP (with base band frequency between −10 MHz and 10 MHz) to a corresponding center frequency Fc in the high frequency band, which is finally transmitted out by the antenna 110. Take 802.11 as an example, a center frequency of the channel Ch1 is located at 2412 MHz, a center frequency of the channel Ch2 is located at 2417 MHz. If the wireless analog transmission unit 120 is operated at the channel Ch2, the wireless analog transmission unit 120 may be set with the center frequency Fc=2417 MHz, and the data packet DP is on the channel with a frequency band from 2407 to 2427 MHz.

In addition, after the packet generating unit 140 generates a protection packet PP1, the baseband processing unit 130 performs digital modulation, encoding, and other processing. If the digital offset bandwidth unit 150 is activated at this moment, the protection packet PP1 is offset toward the positive frequency direction by 5 MHz, and then the wireless analog transmission unit 120 carries the processed protection packet PP1 (with base band frequency between −5 MHz and 15 MHz) to a corresponding center frequency Fc in the high frequency band to become frequency offset packet. Because of the frequency offset, an effective center frequency Fc' for transmitting the processed protection packet PP1 is also offset by 5 MHz in relative to the real center frequency Fc. In other words, the processed protection packet PP1 may be regarded as having the center frequency as Fc'. Thus, the wireless communication device 100 transmits the data packet DP on the channel Ch2 with the center frequency of 2417 MHz, and transmits the protection packet PP1 equivalently on the channel Ch3 with the center frequency of 2422 MHz after processing of the digital offset bandwidth unit 150. Therefore, the processed protection packet PP1 becomes a general packet availably demodulated on in the channel Ch3.

On the other hand, after the packet generating unit 140 generates another protection packet PP2, the baseband processing unit 130 performs digital modulation, encoding, etc. If the digital offset bandwidth unit 150 is activated at this moment, the protection packet PP2 is offset toward the negative frequency direction by 5 MHz, and then the wireless analog unit transmitter 120 carries the processed protection packet PP2 (with base band frequency between −15 MHz to 5 MHz) to a corresponding center frequency Fc in the high frequency band to become frequency offset packet. Because of the frequency offset, an effective center frequency Fc' for transmitting the processed protection packet PP2 is also offset by 5 MHz in relative to the real center frequency Fc. In other words, the processed protection packet PP2 may be regarded as having the center frequency as Fc'. Thus, the wireless communication device 100 transmits the data packet DP on the channel Ch2 with the center frequency of 2417 MHz, and transmits the protection packet PP2 equivalently on the channel Ch1 with the center frequency of 2412 MHz after processing of the digital offset bandwidth unit 150. Therefore, the processed protection packet PP2 becomes a general packet availably demodulated on in the channel Ch1. In circuit implementation, the offset bandwidth unit 150 may be implemented by a complex multiplier (e.g. exp(jwt)). As a result, the digital offset bandwidth unit 150 may perform digital offset bandwidth processing to offset the protection packets PP1-PPN in relative to the data packet DP in the base band, such that at least one effective center frequency for transmitting the processed protection packets PP1-PPN is equal to at least one central frequency of the adjacent channels AC1-ACN. Therefore, the protection packets PP1-PPN are transmitted on the adjacent channels AC1-ACN without switching the operated central frequency Fc.

Figure 3:
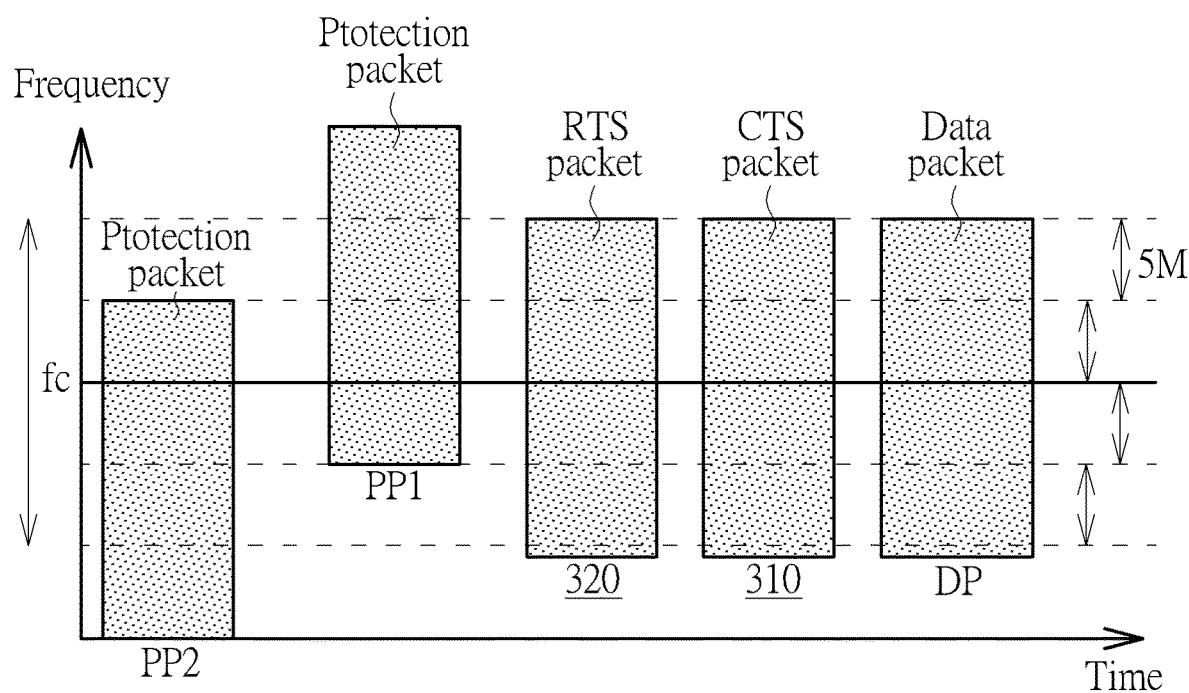
FIG. 3 is a schematic diagram of operations of the wireless communication device shown in FIG. 1 according to an embodiment of the present disclosure.

Specifically, please refer to FIG. 3, which is a schematic diagram of operations of the wireless communication device 100 shown in FIG. 1 according to an embodiment of the present disclosure. As shown in FIG. 3, in 802.11 specification, before the wireless communication device 100 (as a transmission end) transmits the data packet DP, the wireless communication device 100 may send an RTS packet 320 first for protection, and a receiving end replies a CTS packet 310 indicating that the channel is in a clear state. The RTS packet 320 may carry an NAV time, which indicates the time that the transmission end is about to occupy the channel (that is, the time required for completion of transmission of the data packet DP). In this case, the present disclosure further transmits the protection packets PP1-PPN before the RTS packet 320 for protection. The protection packets PP1-PPN may be CTS2self packets. The protection packets PP1-PPN may be offset toward the positive frequency direction as the protection packet PP1 or toward the negative frequency direction as the protection packet PP2. Each of the protection packets PP1-PPN has its own different offset frequency. The protection packets PP1-PPN may also carry the NAV time, which indicates the time that the wireless communication device 100 (as the transmission end) is about to occupy this channel (that is, indicating at least one user of the at least one adjacent channel to stop using the at least one adjacent channel before transmission of the data packet is DP completed). The wireless communication device 100 uses this NAV time to ensure that the data packet DP is transmitted without collision with other packets.

Notably, the above embodiment of the present disclosure transmits the protection packets PP1-PPN on the adjacent channels AC1-ACN, to indicate to at least one user of the adjacent channels AC1-ACN to stop using the adjacent channels AC1-ACN before transmission of the data packet DP is completed, to avoid collisions. Those skilled in the art may make modifications or alterations accordingly, which are not limited to this. For example, FIG. 2 and FIG. 3 only illustrate two protection packets PP1-PP2. In practice, when a WiFi channel bandwidth is 20 MHz, a channel may be overlapped with 3 previous channels and 3 following channels (i.e., a channel Ch4 may be overlapped with channels Ch1-Ch3, Ch5-Ch7). Therefore, 6 protection packets may be transmitted to avoid collisions. Furthermore, the channels Ch3, Ch1 respectively corresponding to the protection packets PP1, PP2 are overlapped, so that FIG. 3 illustrates transmission in a time division multiplexing manner. However, if the protection packets are transmitted one the adjacent channels without overlapping, the protection packets may be transmitted simultaneously (e.g., simultaneously transmitting non-overlapping protection packets of the at least one protection packet on non-overlapping adjacent channels Ch2, Ch6).

Figure 4:
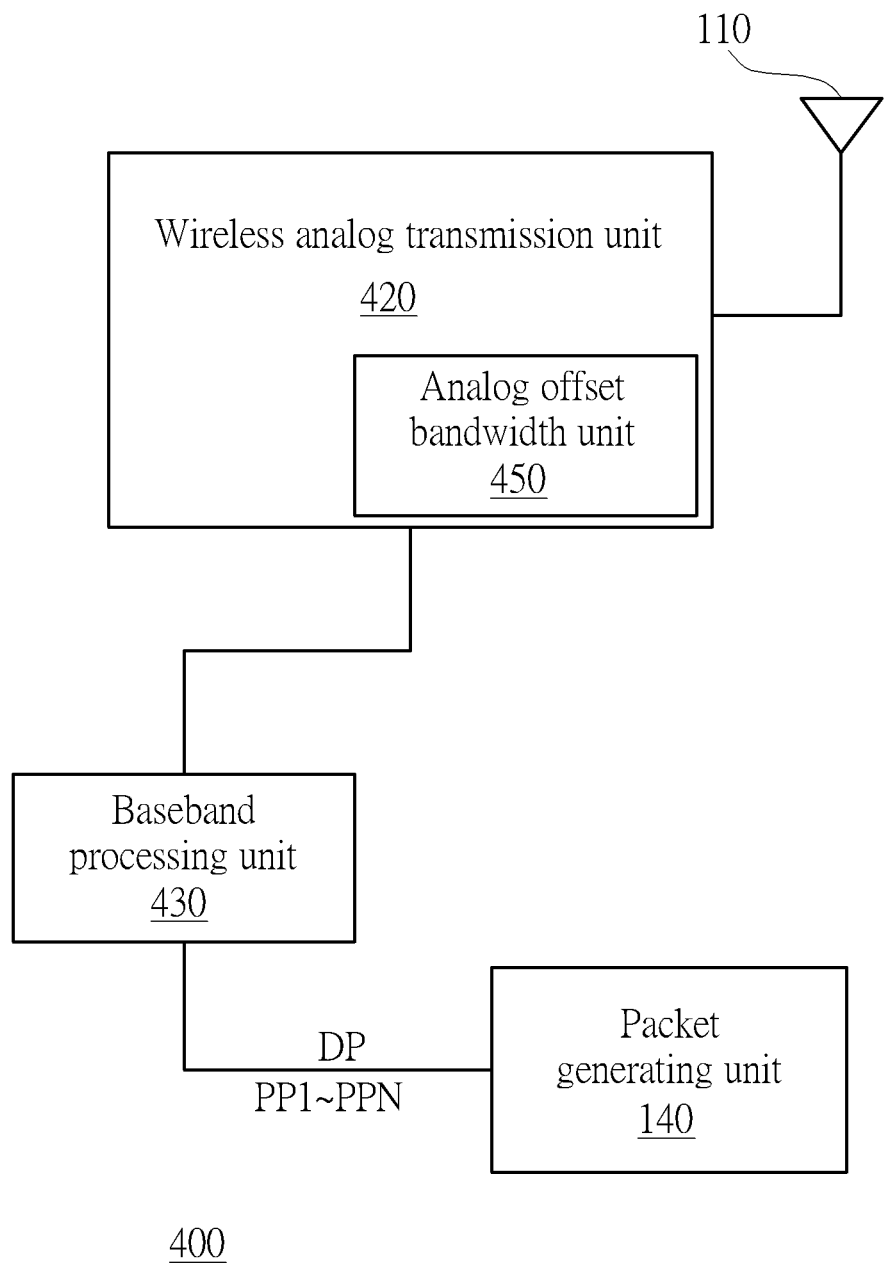
FIG. 4 is a schematic diagram of a wireless communication device according to another embodiment of the present disclosure.

In addition, please refer to FIG. 4, which is a schematic diagram of a wireless communication device 400 according to another embodiment of the present disclosure. Elements and signals of the wireless communication device 400 with similar functions as those of the wireless communication device 100 are denoted by the same symbols, and related operations may be referred to above descriptions and are not repeated herein for brevity. Main difference between the wireless communication device 400 and the wireless communication device 100 is that a baseband processing unit 430 of the wireless communication device 400 performs digital modulation processing without offset bandwidth, and a wireless analog transmission unit 420 of the wireless communication device 400 further includes an analog offset bandwidth unit 450. When the protection packets PP1-PPN are about to be transmitted, the analog offset bandwidth unit 450 is started and offsets the protection packets PP1-PPN to become offset bandwidth packets according to at least one center frequency of the adjacent channels AC1-CAN. Thus, the protection packets PP1-PPN are offset at a radio frequency band and transmitted on the adjacent channels AC1-ACN. In circuit implementation, the analog offset bandwidth unit 450 may be implemented by a carrier frequency control unit, to achieve transmission of offset bandwidth packets (e.g., frequency bands of the protection packet PP1 and the data packet DP are the same in the base band, and a carrier frequency for the protection packet PP1 is directly set to be the center frequency of the channel Ch3).

Figure 5:
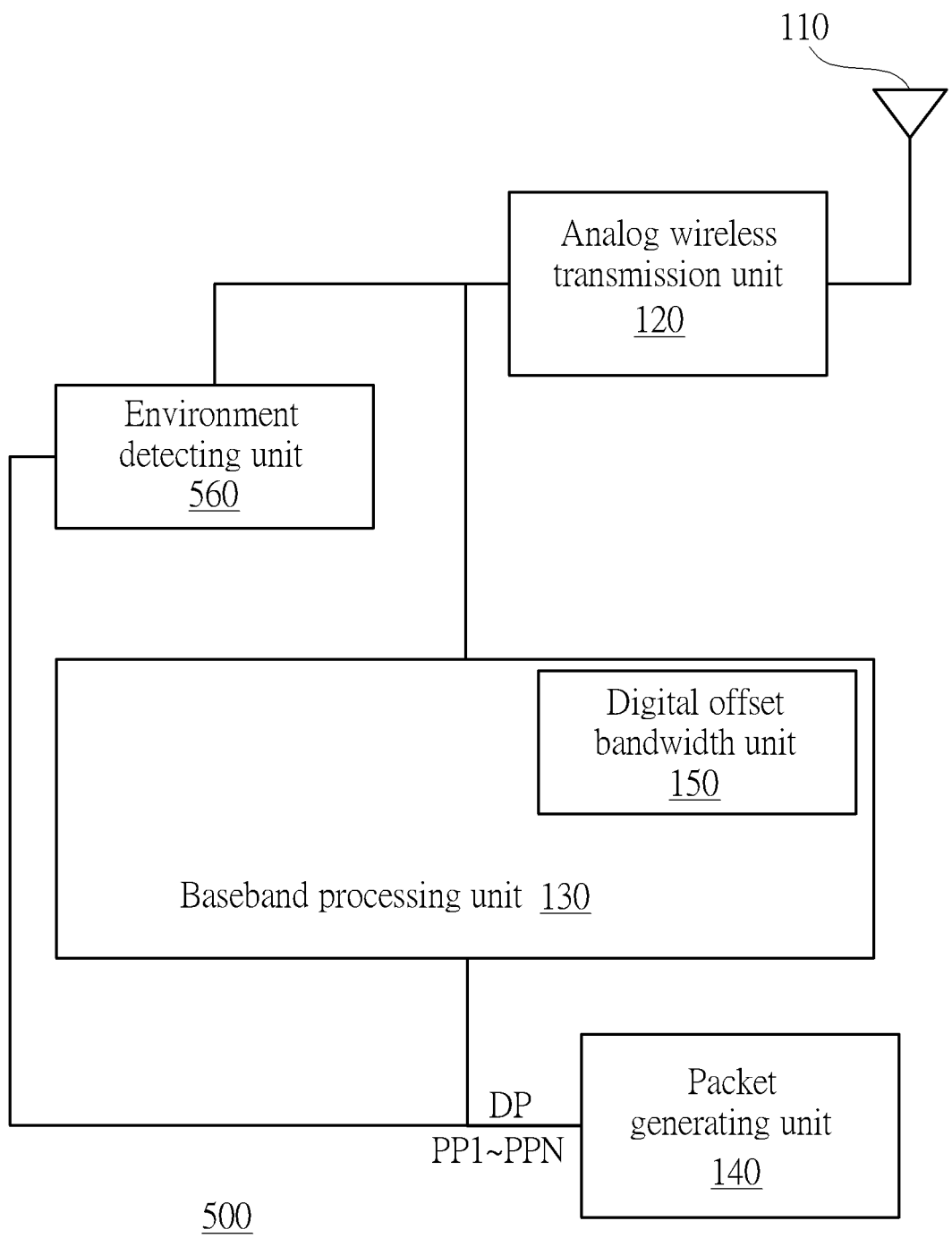
FIG. 5 is a schematic diagram of a wireless communication device according to another embodiment of the present disclosure.

On the other hand, please refer to FIG. 5, which is a schematic diagram of a wireless communication device 500 according to another embodiment of the present disclosure. Elements and signals of the wireless communication device 500 with similar functions as those of the wireless communication device 100 are denoted by the same symbols, and related operations may be referred to above descriptions and are not repeated herein for brevity. Main difference between the wireless communication device 500 and the wireless communication device 100 is that the wireless communication device 500 further includes an environment detecting unit 560 coupled to the wireless analog transmission unit 120 and the packet generating unit 140. The environment detecting unit 560 may detect usage conditions of a plurality of environment channels. In environments that other devices are using the adjacent channels AC1-ACN, the environment detecting unit 560 may notify the packet generating unit 140. Therefore, the packet generating unit 140 transmits the protection packets PP1-PPN for protection before transmitting the data packet DP, so that the data packet DP may not collide with packets sent by other devices on the adjacent channels AC1-ACN. For example, after environment channel detection, if only the channels Ch1, Ch3 are detected with energy reaction and are determined to be currently used by other devices, the environment detecting unit 560 may only notify the packet generating unit 140 to transmit the protection packets PP1 and PP2 on the channels Ch1, Ch3.

Figure 6:
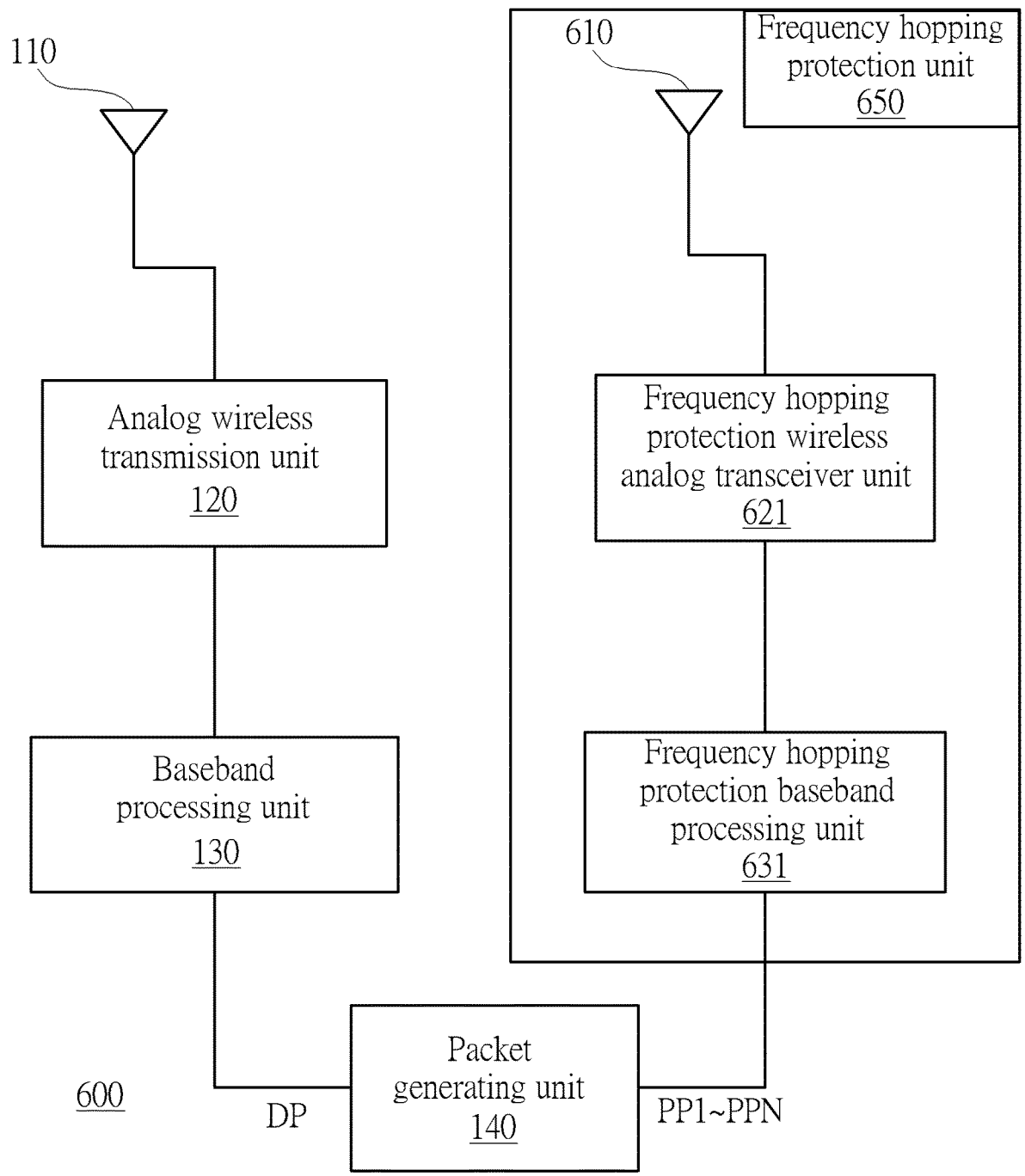
FIG. 6 is a schematic diagram of a wireless communication device according to another embodiment of the present disclosure.

On the other hand, please refer to FIG. 6, which is a schematic diagram of a wireless communication device 600 according to another embodiment of the present disclosure. Elements and signals of the wireless communication device 600 with similar functions as those of the wireless communication device 100 are denoted by the same symbols, and related operations may be referred to above descriptions and are not repeated herein for brevity. Main difference between the wireless communication device 600 and the wireless communication device 100 is that the wireless communication device 600 further includes a frequency hopping protection unit 650, and the frequency hopping protection unit 650 includes an antenna 610, a frequency hopping protection baseband processing unit 631 and a frequency hopping protection wireless analog transceiver unit 621. The frequency hopping protection unit 650 has its own independent transmission unit, and therefore may transmit packet on any channel. When the packet generating unit 140 transmits the data packet DP, since the currently used data transmission channel DC and a related frequency band are known, the frequency hopping protection wireless analog transceiver unit 621 hops to center frequencies of the adjacent channels AC1-ACN of the data transmission channel DC used by the wireless analog transmission unit 120. Then, the frequency hopping protection wireless analog transceiver unit 621 cooperatively transmits the protection packets PP1-PPN (such as RTS or CTS-to-Self) to announce that the data transmission channel DC will be used to avoid collisions due to overlapped frequency bands. As a result, for the microwave band with highly overlapped channels, by adding the frequency hopping protection unit 650, the present disclosure may send the protection packets on the adjacent channels that can be demodulated by users of the adjacent channels, such that the users of the adjacent channels do not transmit packets to collide with the data packet on the data transmission channel to achieve better transmission performance.

Figure 7:
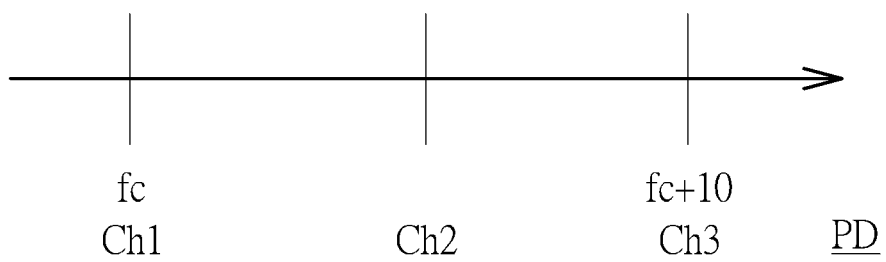
FIG. 7 is a schematic diagram of frequency bands of a data packet and a protection packet according to an embodiment of the present disclosure.
Figure 7:
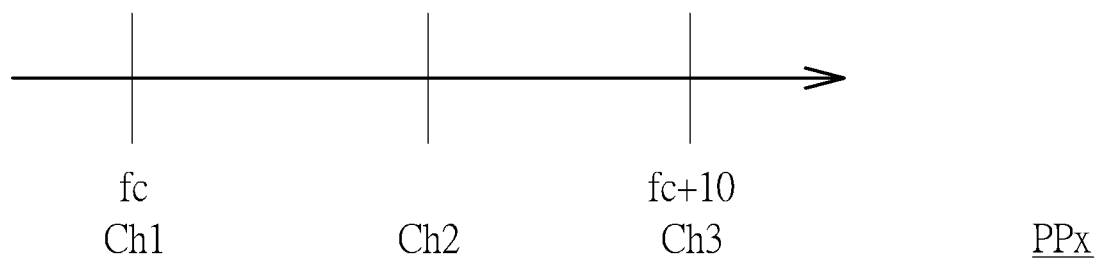

Please refer to FIG. 7, which is a schematic diagram of frequency bands of the data packet DP and a protection packet PPx according to an embodiment of the present disclosure. As shown in FIG. 6 and of FIG. 7, take 802.11 as an example, a center frequency of the channel Ch1 is located at 2412 MHz, a center frequency of the channel Ch3 is located at 2422 MHz. If the wireless analog transmission unit 120 is operated at the channel Ch1, the wireless analog transmission unit 120 may be set with the center frequency Fc=2412 MHz. The frequency hopping protection unit 650 is activated and hops to the center frequency of the channel Ch3 at the edge of the frequency band of the channel Ch1. After the packet generating unit 140 generates a protection packet PPx, the frequency hopping protection base band processing unit 631 performs digital modulation, encoding, etc. Then, through the frequency hopping protection wireless analog transceiver unit 621, the frequency hopping protection unit 650 hops to a position of the centers frequency Fc of the wireless analog transmission unit 120 plus 10 MHz (i.e. Fc+10 MHz). In other words, the protection packet PPx is transmitted with a center frequency Fc+10. Thus, the data packet DP on the channel Ch1 with the center frequency of 2412 MHz is corresponding to the protection packet PPx which originally also has the center frequency of 2412 MHz. After cooperation of the frequency hopping protection unit 650, the protection packet PPx has a center frequency of 2422 MHz. Therefore, the user operates on the channel Ch3 may correctly demodulate the protection packet PPx and stop transmitting packets within protection time, to avoid collision with the user of the channel Ch1.

In this case, timing of the wireless communication device 600 transmitting the protection packets PP1-PPN is substantially similar with the timing of the wireless communication device 100 transmitting the protection packets PP1-PPN, and related operations and variations may be referred to above description (i.e., the protection packet PPx may be sent on the channel Ch3 first, and then the RTS packet 320, the CTS packet 310 and the data packet DP may be sent on the channel Ch1), and are not detailed here for brevity. In addition, since the frequency hopping protection wireless analog transceiver unit 621 of the frequency hopping protection unit 650 may monitor any channel to detect usage conditions of a plurality of environment channels, the frequency hopping protection wireless analog transceiver unit 621 may have functions similar to the environment detecting unit 560 shown in FIG. 5. In environments that other devices are using the adjacent channels AC1-ACN, the frequency hopping protection unit 650 may notify the packet generating unit 140. Therefore, the packet generating unit 140 transmits the protection packets PP1-PPN for protection before transmitting the data packet DP, so that the data packet DP may not collide with packets sent by other devices on the adjacent channels AC1-ACN.

Figure 8:
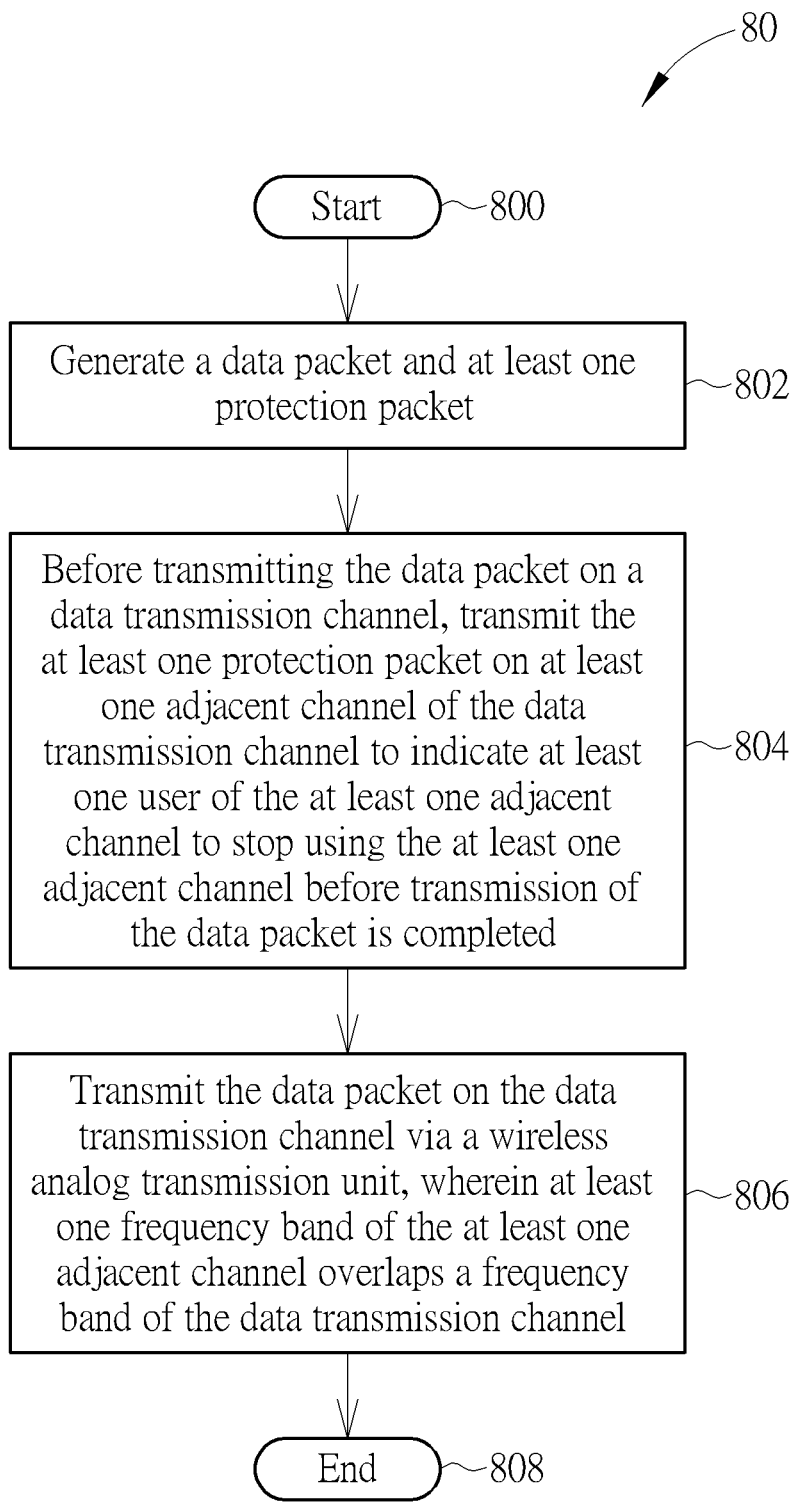
FIG. 8 is a schematic diagram of a packet protection method according to an embodiment of the present disclosure.

Thus, the packet protection operation of the wireless communication device 100 may be summarized as a packet protection method 80 as shown in in FIG. 8. The packet protection method 80 includes following steps:

Step 800: Start.

Step 802: Generate a data packet and at least one protection packet.

Step 804: Before transmitting the data packet on a data transmission channel, transmit the at least one protection packet on at least one adjacent channel of the data transmission channel to indicate to at least one user of the at least one adjacent channel to stop using the at least one adjacent channel before transmission of the data packet is completed.

Step 806: Transmit the data packet on the data transmission channel via a wireless analog transmission unit, wherein at least one frequency band of the at least one adjacent channel overlaps a frequency band of the data transmission channel.

Step 808: End.

Detailed operations of the packet protection method 80 may be refer to those of the wireless communication device 100, and are omitted herein for brevity.

In summary, for the microwave band with highly overlapped channels, the present disclosure may send the protection packets on the adjacent channels that can be demodulated by users of the adjacent channels, such that the users of the adjacent channels do not transmit packets to collide with the data packet on the data transmission channel to achieve better transmission performance.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A wireless communication device, for a transmission end of a wireless communication system, comprising:
    a wireless analog transmission unit, for transmitting a data packet on a data transmission channel; and a packet generating unit, for generating the data packet and at least one protection packet;

wherein before transmitting the data packet on the data transmission channel, the wireless communication device transmits the at least one protection packet on at least one adjacent channel of the data transmission channel to indicate to at least one user of the at least one adjacent channel to stop using the at least one adjacent channel before transmission of the data packet is completed, and at least one frequency band of the at least one adjacent channel overlaps a frequency band of the data transmission channel.

2. The wireless communication device of claim 1 further comprising a baseband processing unit, for performing digital modulation processing on the data packet and the at least one protection packet, wherein the baseband processing unit comprises:

a digital offset bandwidth unit, for perform the digital modulation processing to offset the at least one protection packet in relative to the data packet in a base band.

3. The wireless communication device of claim 2, wherein after processed by the digital offset bandwidth unit, at least one effective center frequency for transmitting the at least one protection packet is equal to at least one central frequency of the at least one adjacent channel.

4. The wireless communication device of claim 2, wherein the digital offset bandwidth unit is a complex multiplier.

5. The wireless communication device of claim 1, wherein the wireless communication device simultaneously transmits at least one non-overlapping protection packet of the at least one protection packet on at least one non-overlapping adjacent channel of the at least one adjacent channel, and at least one frequency band of the at least one non-overlapping adjacent channel is not overlapped.

6. The wireless communication device according to claim 1, wherein the wireless analog transmission unit comprises:

an analog offset bandwidth unit, for offsetting the at least one protection packet in relative to the data packet in a radio frequency band according to at least one center frequency of the at least one adjacent channel.

7. The wireless communication device according to claim 6, wherein the analog offset bandwidth unit is a carrier frequency control unit.

8. The wireless communication device of claim 1 further comprising:

an environment detecting unit, coupled to the wireless analog transmission unit and the packet generating unit, for detecting usage conditions of a plurality of environment channels;

wherein the at least one adjacent channel is currently used channel of the plurality of environment channels.

9. The wireless communication device of claim 1 further comprising:

a frequency hopping protection unit, comprising a frequency hopping protection wireless analog transceiver unit, for transmitting the at least one protection packet on the at least one adjacent channel according to at least one center frequency of the at least one adjacent channel.

10. The wireless communication device of claim 9, wherein the frequency hopping protection wireless analog transceiver unit detects usage conditions of a plurality of environment channels, and the at least one adjacent channel is currently used channel of the plurality of environment channels.

11. A packet protection method, for a transmission end of a wireless communication system, comprising:

generating a data packet and at least one protection packet;

before transmitting the data packet on a data transmission channel, transmitting the at least one protection packet on at least one adjacent channel of the data transmission channel to indicate to at least one user of the at least one adjacent channel to stop using the at least one adjacent channel before transmission of the data packet is completed; and transmitting the data packet on the data transmission channel via a wireless analog transmission unit;

wherein at least one frequency band of the at least one adjacent channel overlaps a frequency band of the data transmission channel.

12. The packet protection method of claim 11 further comprising:

perform digital modulation processing to offset the at least one protection packet in relative to the data packet in a base band.

13. The packet protection method of claim 12, wherein at least one effective center frequency for transmitting the at least one protection packet is equal to at least one central frequency of the at least one adjacent channel.

14. The packet protection method of claim 12 further comprising:

perform the digital modulation processing to offset the at least one protection packet in relative to the data packet in the base band via a complex multiplier.

15. The packet protection method of claim 11 further comprising:

simultaneously transmitting at least one non-overlapping protection packet of the at least one protection packet on at least one non-overlapping adjacent channel of the at least one adjacent channel, wherein at least one frequency band of the at least one non-overlapping adjacent channel is not overlapped.

16. The packet protection method of claim 11 further comprising:

offsetting the at least one protection packet in relative to the data packet in a radio frequency band according to at least one center frequency of the at least one adjacent channel.

17. The packet protection method of claim 16 further comprising:

offsetting the at least one protection packet in relative to the data packet in the radio frequency band according to the at least one center frequency of the at least one adjacent channel via a carrier frequency control unit.

18. The packet protection method of claim 11 further comprising:

detecting usage conditions of a plurality of environment channels;

wherein the at least one adjacent channel is currently used channel of the plurality of environment channels.

19. The packet protection method of claim 11 further comprising:

transmitting the at least one protection packet on the at least one adjacent channel according to at least one center frequency of the at least one adjacent channel via a frequency hopping protection wireless analog transceiver unit.

20. The packet protection method of claim 19 further comprising:

detecting usage conditions of a plurality of environment channels via the frequency hopping protection wireless analog transceiver unit, wherein the at least one adjacent channel is currently used channel of the plurality of environment channels.

* * * * *